United States Patent
Takeuchi et al.

(10) Patent No.: US 7,889,426 B2
(45) Date of Patent: Feb. 15, 2011

(54) DIFFRACTIVE LENS AND SCANNING LENS FORMED WITH DIFFRACTIVE LENS

(75) Inventors: Shuichi Takeuchi, Saitama (JP); Yutaka Takakubo, Saitama (JP)

(73) Assignee: Hoya Corporation, Tokyo (JP)

( * ) Notice: Subject to any disclaimer, the term of this patent is extended or adjusted under 35 U.S.C. 154(b) by 493 days.

(21) Appl. No.: 11/427,521

(22) Filed: Jun. 29, 2006

(65) Prior Publication Data

US 2007/0002446 A1   Jan. 4, 2007

(30) Foreign Application Priority Data

Jul. 1, 2005   (JP) .............................. 2005/194155

(51) Int. Cl.
  *G02B 5/18*   (2006.01)
(52) U.S. Cl. ..................................... 359/569
(58) Field of Classification Search .................. 359/569, 359/566
  See application file for complete search history.

(56) References Cited

U.S. PATENT DOCUMENTS

| | | |
|---|---|---|
| 6,115,164 A | 9/2000 | Kamikubo |
| 6,124,962 A | 9/2000 | Kamikubo |
| 6,201,626 B1 | 3/2001 | Kamikubo |
| 6,259,547 B1 | 7/2001 | Kamikubo |
| 6,400,486 B1 | 6/2002 | Iizuka |
| 6,404,530 B1 | 6/2002 | Takeuchi |
| 6,493,126 B1 | 12/2002 | Iizuka |
| 6,624,941 B2 | 9/2003 | Takeuchi et al. |
| 2003/0174374 A1* | 9/2003 | Takeuchi ..................... 359/205 |
| 2005/0179771 A1* | 8/2005 | Ueda .......................... 347/241 |
| 2006/0023971 A1* | 2/2006 | Takakubo ................... 382/312 |

FOREIGN PATENT DOCUMENTS

| | | |
|---|---|---|
| JP | 7-294707 | 11/1995 |
| JP | 10-197820 | 7/1998 |
| JP | 11-095145 | 4/1999 |

OTHER PUBLICATIONS

English language Abstract of JP 10-197820.
English language Abstract of JP 11-095145.
English language Abstract of JP 7-294707.

* cited by examiner

*Primary Examiner*—Joshua L Pritchett
(74) *Attorney, Agent, or Firm*—Greenblum & Bernstein P.L.C.

(57) ABSTRACT

A scanning lens for an imaging optical system converges a beam emitted by a light source and deflected by a deflector on a target surface to form a beam spot scanning in a main scanning direction thereon. The scanning lens includes a plastic lens formed by injection molding, which has a diffractive lens structure on at least one surface thereof. The diffractive lens structure has a plurality of annular zones arranged concentrically about a rotational axis. Each annular zone has a diffracting surface that diffracts the light beam passing therethrough. The diffractive lens structure has stepped surfaces each connecting adjoining diffracting surfaces. In a plane including the rotational axis and parallel with the main scanning direction, the stepped surfaces are inclined with respect to the rotational axis so that stress working between a metallic molding for the plastic lens and each of the stepped surfaces in demolding is reduced.

7 Claims, 7 Drawing Sheets

······ SHAPE OF METALLIC MOLDING
—— SHAPE OF MOLDED PRODUCT

--- DESIGN SHAPE
—— ACTUAL SHAPE

- - - - DESIGN SHAPE
——— ACTUAL SHAPE

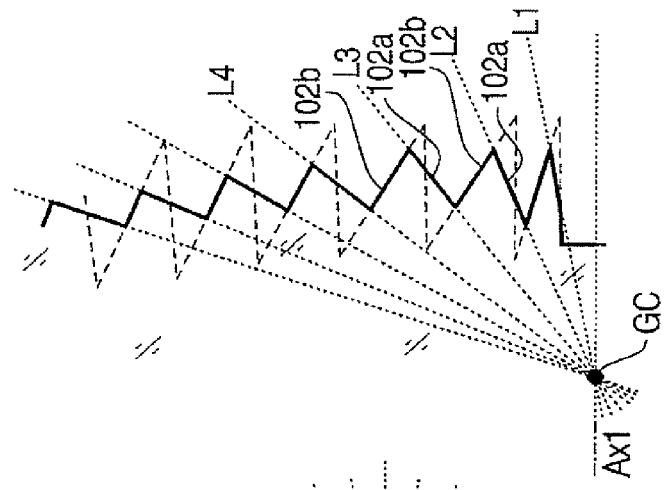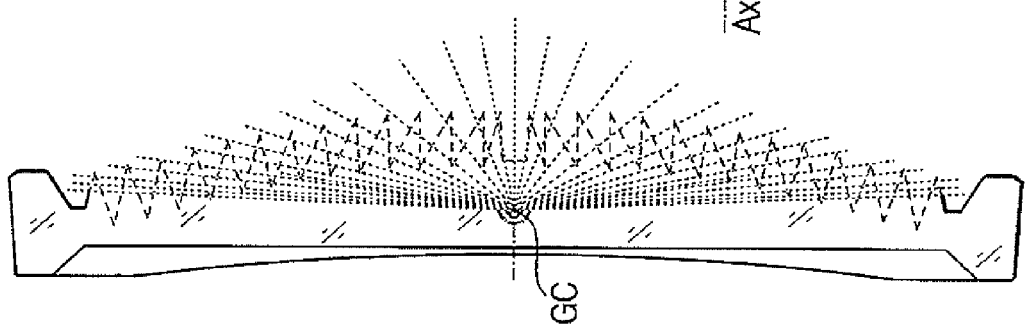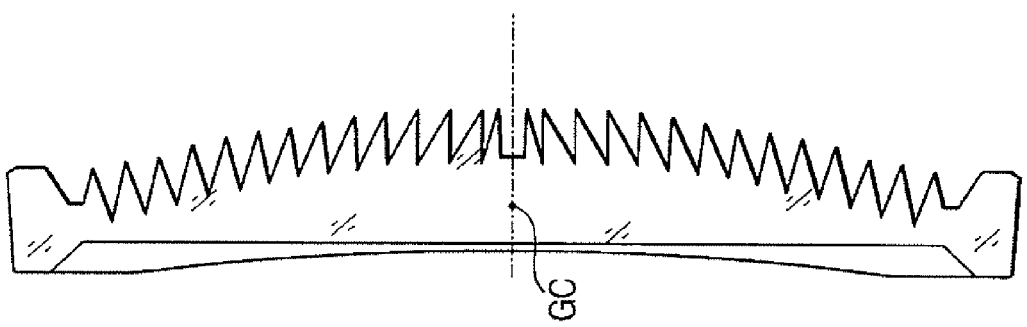

DIFFRACTIVE LENS AND SCANNING LENS FORMED WITH DIFFRACTIVE LENS

BACKGROUND OF THE INVENTION

The present invention relates to a scanning lens having a lens element formed with a diffractive lens having a plurality of annular zones on a surface of the lens element, and the diffractive lens formed on the lens element.

Conventionally, a diffractive lens having a lens element formed with a diffractive lens structure thereon has been widely used for various purposes. Examples of the diffractive lenses are disclosed in Japanese Patent Provisional Publications No. HEI 10-197820 (hereinafter, referred to as '820 publication) and No. HEI 11-095145 (hereinafter, referred to as '145 publication). In each of '820 publication and '145 publication, a scanning optical system including a diffractive lens as a scanning lens is disclosed. The scanning optical system is configured such that, a beam emitted by a laser source is deflected by a deflector such as a polygonal mirror or a galvano mirror to scan within a predetermined angular range. The scanning beam is converged, by an fθ lens, on a surface to be scanned (e.g., a surface of a photoconductive drum) and a beam spot is formed thereon. The beam spot moves on the surface of the photoconductive drum in a main scanning direction as the deflector rotates. By ON/OFF modulating the laser beam as it travels in the main scanning direction, a electrostatic latent image is formed on the surface of the photoconductive drum. Since the photoconductive drum is rotates synchronously with the main scanning operation (i.e., an auxiliary scanning operation is performed), a two-dimensional latent image is formed on the surface of the photoconductive drum.

Recently, the laser printers are required to process data rapidly. It is also required that color images are printed by the laser printers. For such purposes, a multi beam scanning optical system or a tandem scanning optical system configured to deflect a plurality of beams emitted by a plurality of light sources using a single deflector (e.g., a polygonal mirror) is used. When a plurality of light sources are used, however, if the wavelengths of the laser beams emitted by the plurality of light sources are different from each other, due to longitudinal chromatic aberration provided by the optical system, a scanning width error occurs. That is, a plurality of scanning lines formed by the scanning beams are different from each other due to the longitudinal chromatic aberration. The optical scanning system disclosed in '820 publication or '145 publication employs a diffractive lens structure that compensates for chromatic aberration on a surface of a scanning lens element.

Generally, the scanning lens used in laser printers are formed by plastic injection molding. However, if the scanning lens element formed with the diffractive lens structure as disclosed in the '820 publication or '145 publication by the plastic injection molding, when the lens itself contracts when demolded from the molding, stepped surfaces between adjacent annular zones and portions therearound may be distorted. As a result, the resultant shape of the diffractive lens structure may be different from the designed shape, that is, different from the molding, and the diffractive efficiency may be significantly lowered. In particular, at a peripheral portion where the width of each annular zone is relatively narrow and density of the annular zones are relatively high, the effect of the distorted shape is significant. When such a lens is used, the intensity of light at a peripheral portion is lowered, which results in deterioration of printed images.

SUMMARY OF THE INVENTION

In consideration of the foregoing problems of conventional arts, the present invention is advantageous in that there is provided an improved scanning optical system and a diffractive lens therefor, which is configured such that the stepped portions are hardly distorted when a lens element provided with the diffractive lens structure is formed is made by injection molding so that the diffractive efficiency can be retained at a high value.

According to aspects of the invention, there is provided a scanning lens for an imaging optical system that converges a beam emitted by a light source and deflected by a deflector on a target surface to form a beam spot scanning in a main scanning direction thereon. The scanning lens includes a plastic lens formed by injection molding, which has a diffractive lens structure on at least one surface thereof. The diffractive lens structure has a plurality of concentric annular zones which are arranged concentrically about a rotational axis, each of the plurality of annular zones having a diffracting surface that diffracts the light beam passing therethrough, the diffractive lens structure having stepped surfaces each connecting adjoining diffracting surfaces. The stepped surfaces are designed such that, in a plane including the rotational axis and parallel with the main scanning direction, the stepped surfaces are inclined with respect to the rotational axis so that stress working between a metallic molding for the plastic lens and each of the stepped surfaces in demolding is reduced.

Alternatively, according to aspects of the invention, the stepped surfaces may be designed such that in a plane including the rotational axis and parallel with the main scanning direction, the stepped surfaces are inclined with respect to normal lines to adjoining diffracting surfaces so that stress working between a metallic molding for the plastic lens and each of the stepped surfaces in demolding is reduced.

A design inclination of the stepped surface may be substantially similar to a direction in which the lens deforms due to contraction of plastic when the plastic lens is demolded from the metallic molding.

The plastic lens may be formed such that plastic is injected through a gate which is arranged on the plane substantially parallel with the plane including the rotational axis and parallel with the main scanning direction. In this case each of the stepped surfaces may be designed to be substantially parallel, in the plane substantially parallel with the plane including the rotational axis and parallel with the main scanning direction, with a line connecting a point where the stepped surface is connected with the diffracting surface and a point that is a projection of a substantially central point of the gate on the plane including the rotational axis and parallel with the main scanning direction.

According to aspects of the invention, there is provided a diffractive lens made of plastic formed by injection molding, the diffractive lens having a diffractive lens structure on at least one surface thereof the diffractive lens structure having a plurality of concentric annular zones which are arranged concentrically about a rotational axis, each of the plurality of annular zones having a diffracting surface that diffracts the light beam pass therethrough, the diffractive lens structure having stepped surfaces each connecting adjoining diffracting surfaces, the stepped surfaces being designed such that in a plane including the rotational axis, the stepped surfaces are inclined with respect to the rotational axis so that stress working between a metallic molding for the plastic lens and each of the stepped surfaces in demolding is reduced.

A design inclination of the stepped surface of the diffractive lens may be substantially similar to a direction in which the lens deforms due to contraction of plastic when the diffractive lens is demolded from the metallic molding.

The diffractive lens can be included in an imaging optical system that converges a beam emitted by a light source and deflected by a deflector on a target surface to form a beam spot scanning in a main scanning direction thereon. In such a case, the plane including the rotational axis may be parallel with the main scanning direction.

The diffractive lens may be formed such that plastic is injected through a gate which is arranged on the plane substantially parallel with the plane including the rotational axis, and each of the stepped surfaces may be designed to be substantially parallel, in the plane substantially parallel with the plane including the rotational axis, with a line connecting a point where the stepped surface is connected with the diffracting surface and a point that is a projection of a substantially central point of the gate on the plane including the rotational axis.

BRIEF DESCRIPTION OF THE ACCOMPANYING DRAWINGS

FIGS. 10A-10C shows a process to form the scanning lens according to the second embodiment.

Figure 11:
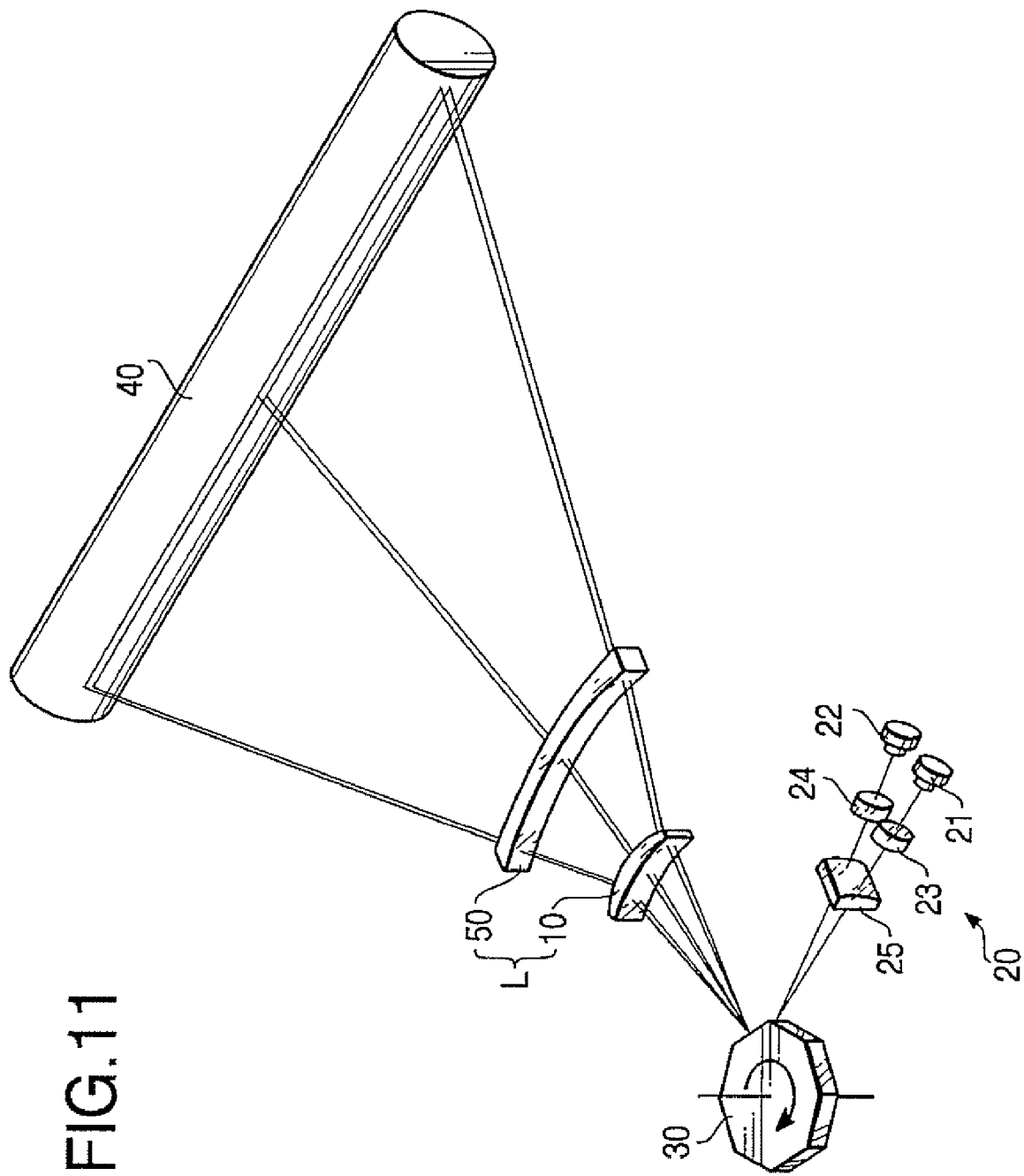

FIG. 11 schematically shows a perspective view of a multibeam scanning optical system employing the scanning lens according to the first embodiment.

DETAILED DESCRIPTION OF THE EMBODIMENTS

Hereinafter, referring to the accompanying drawings, scanning lenses according to embodiments of the invention will be described.

First Embodiment

Figure 1A:
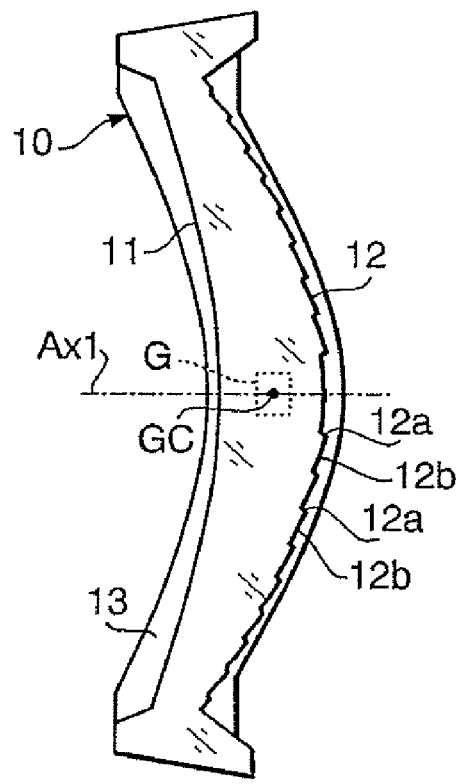
FIG. 1A shows a cross sectional side view of a scanning lens according to a first embodiment of the invention.
Figure 1B:
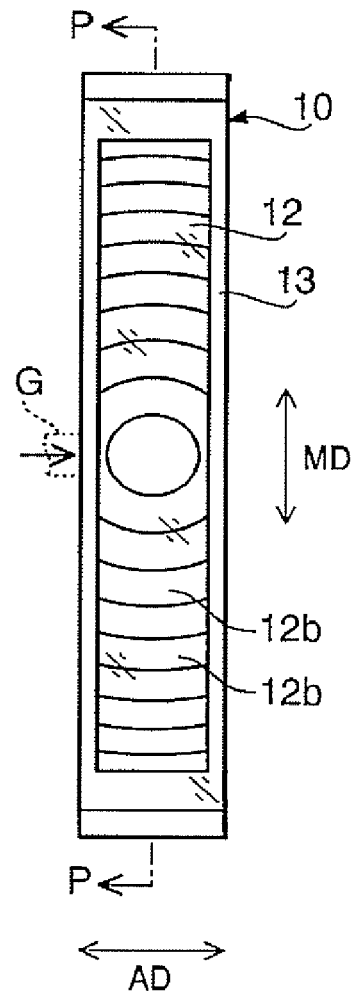
FIG. 1B is a front view of the scanning lens shown in FIG. 1A according to the first embodiment.

FIG. 1A shows a cross sectional side view of a scanning lens 10 according to a first embodiment of the invention, and FIG. 1B is a front view of the scanning lens 10 shown in FIG. 1A. It should be noted that FIG. 1A is a view take along line P-P of FIG. 1B. The scanning lens 10 is arranged between a polygonal mirror and a photoconductive drum of a scanning optical system. Specifically, the scanning lens 10 is arranged such that a first surface 11, which is on the left-hand side in FIG. 1A, is on the polygonal mirror side, and a second surface 12, which is on the right-hand side in FIG. 1A, is on the photoconductive drum side. As shown in FIG. 1B around the lens surfaces allowing the light to transmit, a rib 13 used for fixing the scanning lens 10 onto a device is formed. In FIGS. 1A and 1B, G denotes a gate and GC represents the center of the gate.

Generally, a scanning lens to be used in a laser printer or the like, light scans in one direction (i.e., in a main scanning direction). Therefore, the scanning lens has a certain length in the main scanning direction, while a length in a perpendicular direction (i.e., an auxiliary scanning direction) can be relatively small. Thus, as shown in FIG. 1B, the scanning lens 10 has an elongated shape, which has different lengths in the main scanning direction MD and the auxiliary scanning direction AD.

As shown in FIG. 1A, the scanning lens 10 is, macroscopically, a meniscus lens having a concave first surface 11 and a convex second surface 12. Microscopically, a diffractive lens structure is formed on the second surface 12. The diffractive lens structure includes a plurality of rotationally-symmetrical annular zones coaxial about the optical axis Ax1. The diffractive lens structure includes operating surfaces 12b which diffracts light passing therethrough, and stepped surfaces 12a connecting adjoining operating surfaces. It should be noted that, in FIG. 1A, in order to shown the shapes of each portion, the diffractive lens structure is drawn exaggerated such that the number of the annular zones are reduced and the height of the stepped portions are larger with respect to the actual shape. In an actual scanning lens, the annular zones are formed at more minute pitch.

The designed shape of the stepped surfaces 12a of the diffractive lens structure is such that, in a cross section along a plane including a rotational axis of the annular zones and parallel with the main scanning direction, each stepped surface 12a inclines with respect to the rotational axis (i.e., the optical axis Ax1 in this illustrative embodiment). The scanning lens 10 according to the first embodiment is formed by plastic injection molding using a metal mold. The inclination of the stepped surfaces 12a is designed such that stress working between the stepped surfaces 12a and the metal mold when the scanning lens 10 is demolded is reduced. Specifically, when the scanning lens 10 is demolded from the metal mold, the metal mold is slid in the optical axis direction and the removed from the scanning lens 10. It should be noted that the width of the stepped surfaces 12a viewed along the optical axis Ax1 is very minute, it is not shown in FIG. 1B.

Next, a change of the shape of a portion of the scanning lens 10 around the stepped surface 12a when the lens is demolded is described with reference to a comparative example in which each stepped surface of the metal mold is substantially parallel with a normal to each of the annular zones adjacent to the stepped surface, with reference to FIGS. 2-4.

Figure 2:
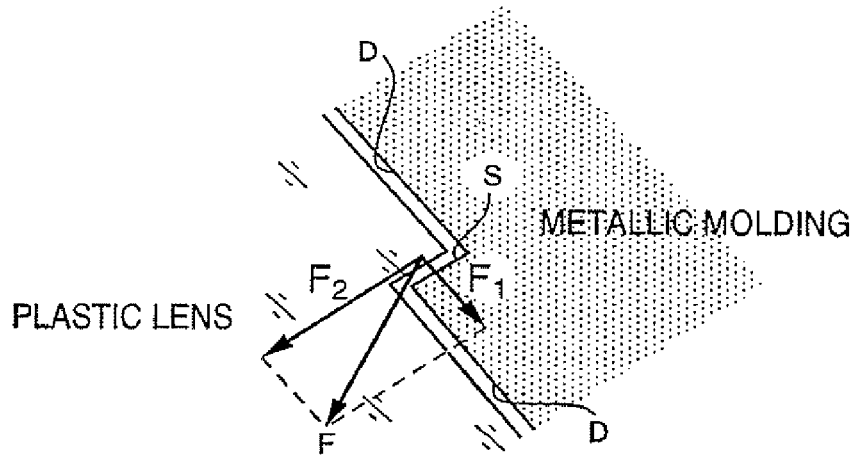
FIG. 2 is an enlarged partial view of a mold of a comparative example.
Figure 3:
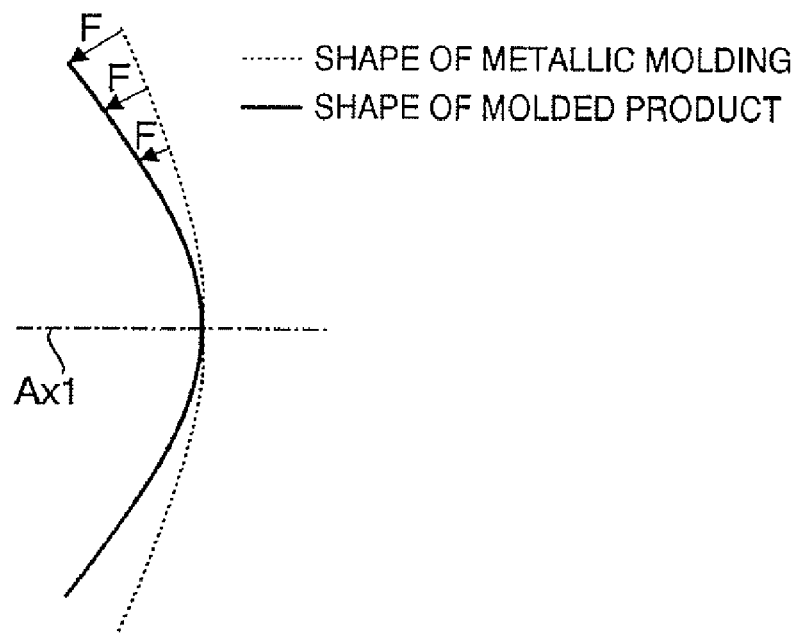
FIG. 3 shows a deformation of a plastic lens when it is cooled after molded.

The metal mold of the comparative example is configured such that, as shown in FIG. 2, the surface S of the step is substantially parallel to a normal to the adjacent operating surface D. The convex surface of the plastic lens contracts, when it is cooled and solidified, in a direction where the curvature is increased as shown by solid lines with respect to the metal mold (indicated by broken lines) in FIG. 3. Therefore, the stress F due to the contraction is, as shown by arrow in FIG. 3, concentrated toward the center of the curvature of the lens surface where the diffractive lens structure is formed, and its direction depends on the distance from the optical axis Ax1. Focusing on each stepped surface S, the stress F can be divided into a component F1 perpendicular to the stepped surface S and a component F2 parallel with the stepped surface S. The parallel component F2 works in a direction where the lens slides along the metal mold when demolded, and thus the parallel component F2 does not act on the plastic lens 10. The perpendicular component F1 works to urge the stepped surface S toward the metal mold. Therefore, the perpendicular component F1 may cause the stress when the lens is demolded from the metal mold. Therefore, if the stepped surfaces faces are perpendicular to the light incident surfaces of the annular zones, as in the comparative example, the perpendicular component F1 is relatively large, which may cause the stepped surface and/or portions therearound to be distorted when the lens is demolded.

Figure 4:
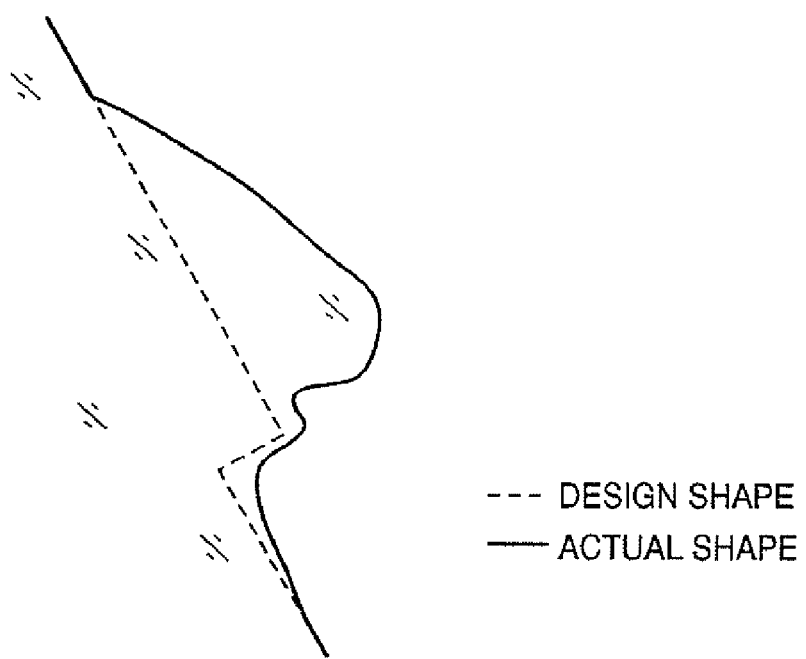
FIG. 4 shows a designed shape and an actual shape of a stepped portion of a lens molded using the mold shown in FIG. 2.

FIG. 4 shows an enlarged view of an example of the plastic lens molded using the conventional metal mold as shown in FIG. 2. In FIG. 4, the solid line indicates the actual lens shape, and the broken line indicates the design shape that represents the shape exactly corresponds to the shape of the metal mold (when no distortion or contraction occurs). According to the conventional method, the plastic lens contracts as a whole, but partially expands as the stepped surfaces interfere with the metal mold when demolded, and the actual shape becomes significantly different from the designed shape as shown in FIG. 4. Due to this deformation, the diffractive efficiency is lowered and loss of light amount becomes significant.

Figure 5:
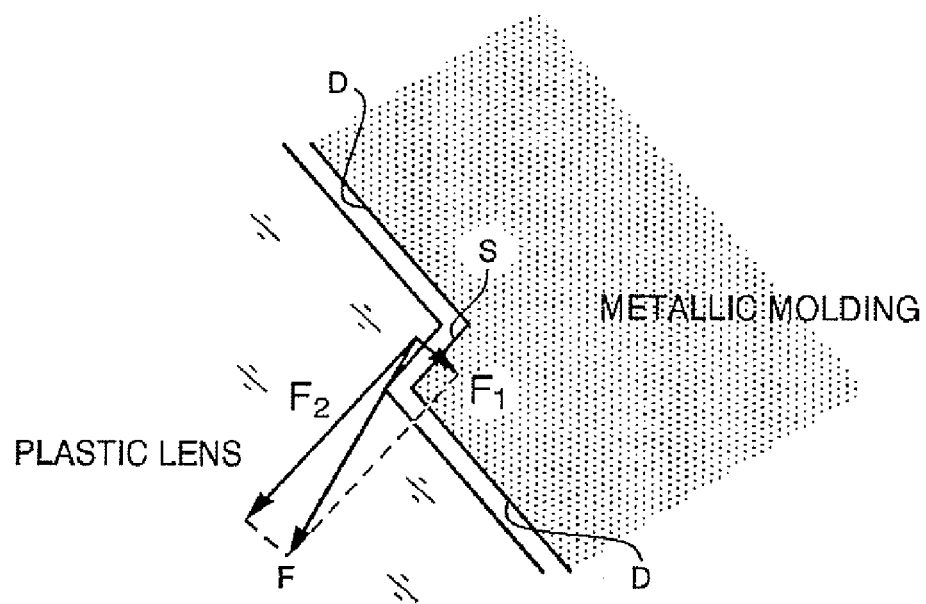
FIG. 5 is an enlarged partial view of a mold used to mold the plastic lens according to the first embodiment.

The scanning lens 10 according to the first embodiment is formed using the metal mold shown in FIG. 5, which is en enlarged view of the stepped surface S and portions therearound, and the corresponding portion of the metal mold. The mold shown in FIG. 5 is configured such that the stepped surface S between two diffraction operating surfaces D is inclined with respect to the normal to the diffraction operation surface D, and further the stepped surface S is inclined with respect to the rotational axis of the plastic lens 10. With the above configuration, the perpendicular component F1 of the stress F due to contraction can be well suppressed, and thus deformation around the stepped surface S can be suppressed.

Figure 6:
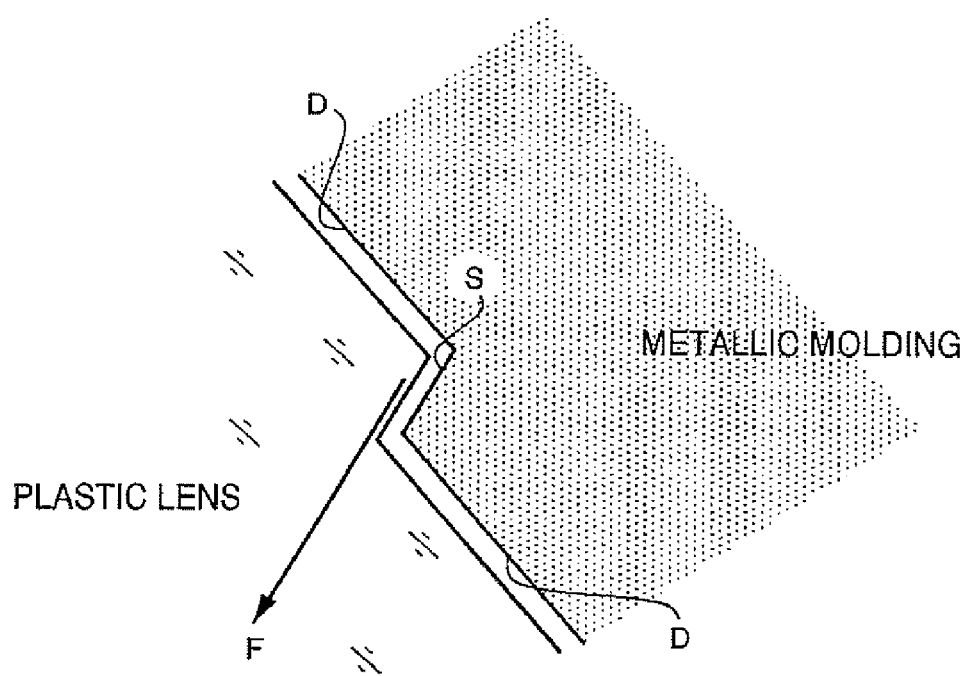
FIG. 6 is an enlarged partial view of another mold which can be used to mold the plastic lens according to the first embodiment.

FIG. 6 shows an enlarged view of another example of the metal mold for forming the plastic lens 10 according to the first embodiment. In this example, the inclination of the stepped surface S is larger than that shown in FIG. 5 so that the stepped surface S is substantially parallel with the direction of the stress F due to the contraction. The deformation of the lens due to the contraction is considered to be the results of the stress applied to each portion of the lens. Therefore, the direction of the deformation of each part of the lens and the direction in which the stress acts are considered to be substantially the same. Accordingly, when the inclination of the stepped surface S is substantially equal to the direction of the stress F, the stress acts on the lens when the lens is demolded can be made smaller than that in a case shown in FIG. 5, and the deformation of the lens at portions around the stepped surface S can be further suppressed.

Figure 7:
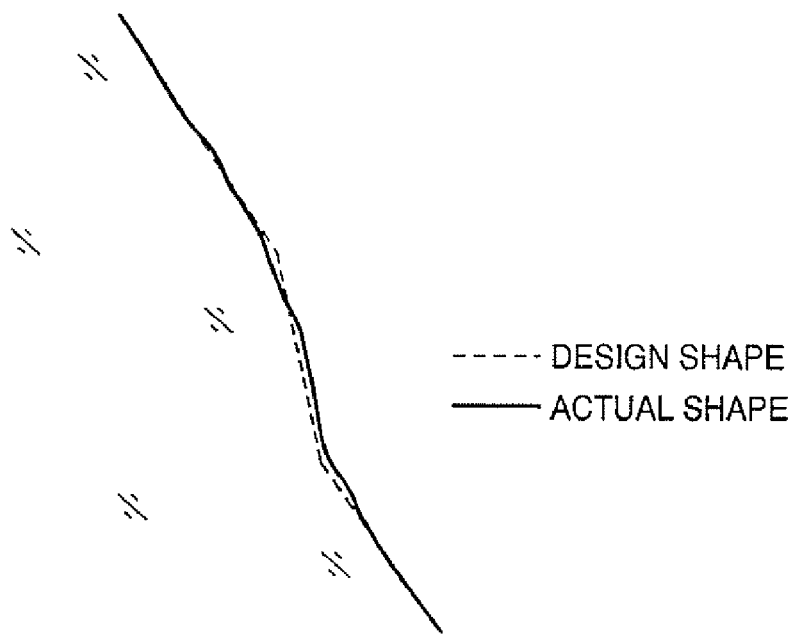
FIG. 7 shows a designed shape and an actual shape of a stepped portion of a lens molded using the mold shown in FIG. 5.

FIG. 7 shows an enlarged view of the stepped surface S of the plastic lens, after demoldation, which is formed using the metal mold according to the first embodiment. In FIG. 7, solid lines represent the actual shape of the lens and broken lines represent the design shape. As shown in FIG. 7, the actual shape is very close to the design shape. Therefore, the diffractive efficiency will not be so lowered, and the loss of the light intensity can be well suppressed.

It should be noted that the description regarding the steps of the lens and metal mold refers to those on a plane including the optical axis Ax1, or the rotational axis of the annular zones and is parallel with the main scanning direction. Such a cross section will occasionally be referred to as a main-scanning cross section, hereinafter. Since the annular zone structures is rotationally symmetrical about the optical axis Ax1, the same stepped surface in any cross section, which is a rotated cross section of the main-scanning cross section, has the same inclination as that in the main-scanning cross section.

Figure 8:
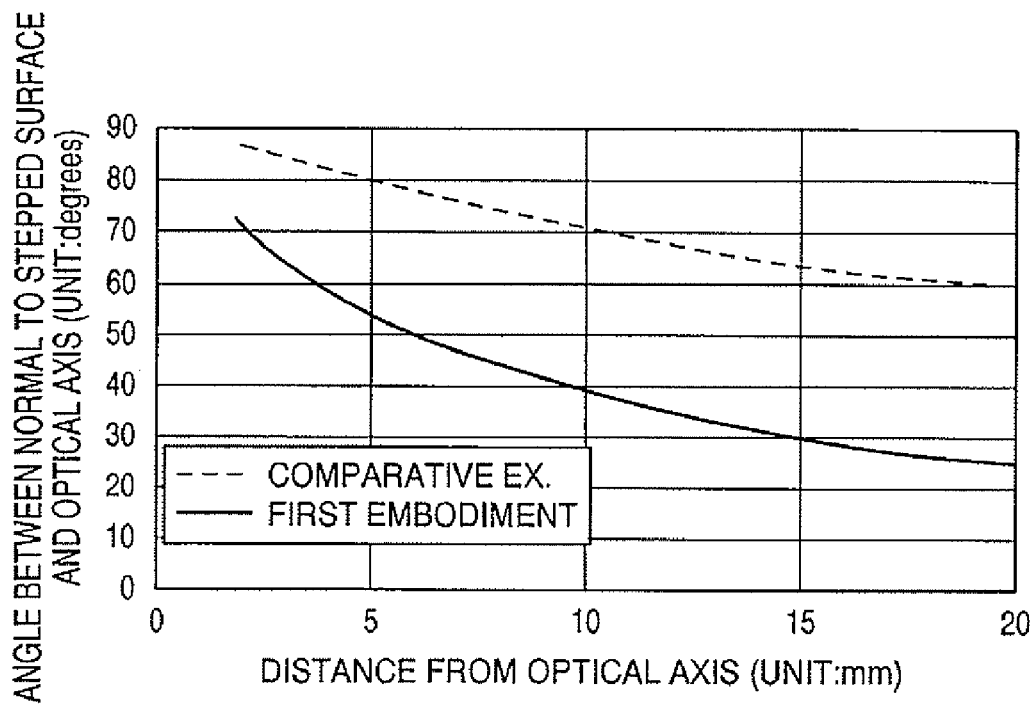
FIG. 8 is a graph showing a relationship between an angle of a normal to each step of the lens with respect to an optical axis of the lens and a distance of the normal from the optical axis for each of the scanning lens according to the invention and the lens according to the comparative example.

The angle (cute angle) formed between the normal to each stepped surface between each adjoining annular zones and distance to the normal has a relationship indicated by a broken line in FIG. 8. Since the diffractive lens structure is formed on a concave base curve, the angle of the normal to each annular zone (operating surface thereof) with respect to the optical axis is larger at a peripheral area than the central area of the lens. Therefore, if the lens is designed such that the stepped surfaces are substantially parallel with the normal to the adjoining diffraction operating surface as in the comparative example, the angle formed between the normal to the stepped surface with respect to the optical axis is smaller as the distance from the optical axis is greater, as indicated by broken line in FIG. 8.

According to the configuration shown in FIG. 6, the stepped surface is formed to be parallel with a direction of the stress F. The angle of the direction of the stress F with respect to the optical axis becomes smaller as the distance from the optical axis increases as shown by broken line in FIG. 8. Tendency of change of the angle with respect to the distance from the optical axis in the comparative example is similar to that in the first embodiment. However, for the same distance, the angle in the first embodiment is smaller than the angle in the comparative example by 15-34 degrees, and the difference of the angles is greater for a larger distance.

The diffraction effect of the diffractive lens is caused by a difference of optical path lengths of the diffraction operating surfaces adjacent to each stepped surface. Therefore, the stepped surfaces do not contribute to the diffraction effect. Therefore, if the stepped surfaces are formed as designed, it is preferable that a width of the stepped surface on a plane perpendicular to the optical axis is small. However, if the width of the stepped surface is designed to be small, the actual shape will be deformed as shown in FIG. 4. Even though the portion which does not contribute to the diffraction effect increases as in the first embodiment, it is preferable that the deformation of the shape is smaller than a case where the deformation is relatively large as shown in FIG. 4. If the deformation is smaller, the usage efficiency of light is larger on the whole.

Next, a method of manufacturing the scanning lens 10 according to the first embodiment will be described.

When the scanning lens 10 is manufactured, it is necessary to avoid the deformation of the stepped surfaces in demolding. In order to avoid the deformation when the lens is demolded, it is necessary to know the force applied to the scanning lens, As described above, when the surface on which the diffractive lens structure is formed is a convex surface, the lens contracts in a direction where the curvature increases. Therefore, the stress is directed to substantially the center of the curvature. When the inclination of the stepped surfaces is determined, it is preferable to know directions of deformation at various positions of the lens exactly. As described above, the scanning lens 10 is elongated in the main scanning direction, only the contraction in the main scanning direction should be taken into account when the inclination of each stepped surface S is determined.

The molding is created as follows. Firstly, a scanning lens is manufactured by way of experiment, and the inclination of each stepped surface of the experimental diffraction lens structure of the scanning lens is measured to determine the direction of deformation at each stepped surface. Then, in correspondence with the thus determined direction of deformation, the inclination of each stepped surface is determined, and the metal molding for manufacturing the scanning lens is made so that each stepped surface of the molded lens has the determined inclination. Then, using the metal molding, the scanning lens is manufactured. According to this way, it is possible to reduce the stress F1 which functions to urge the stepped lens to the metal molding at the stepped surfaces can be made small.

Second Embodiment

Figure 9:
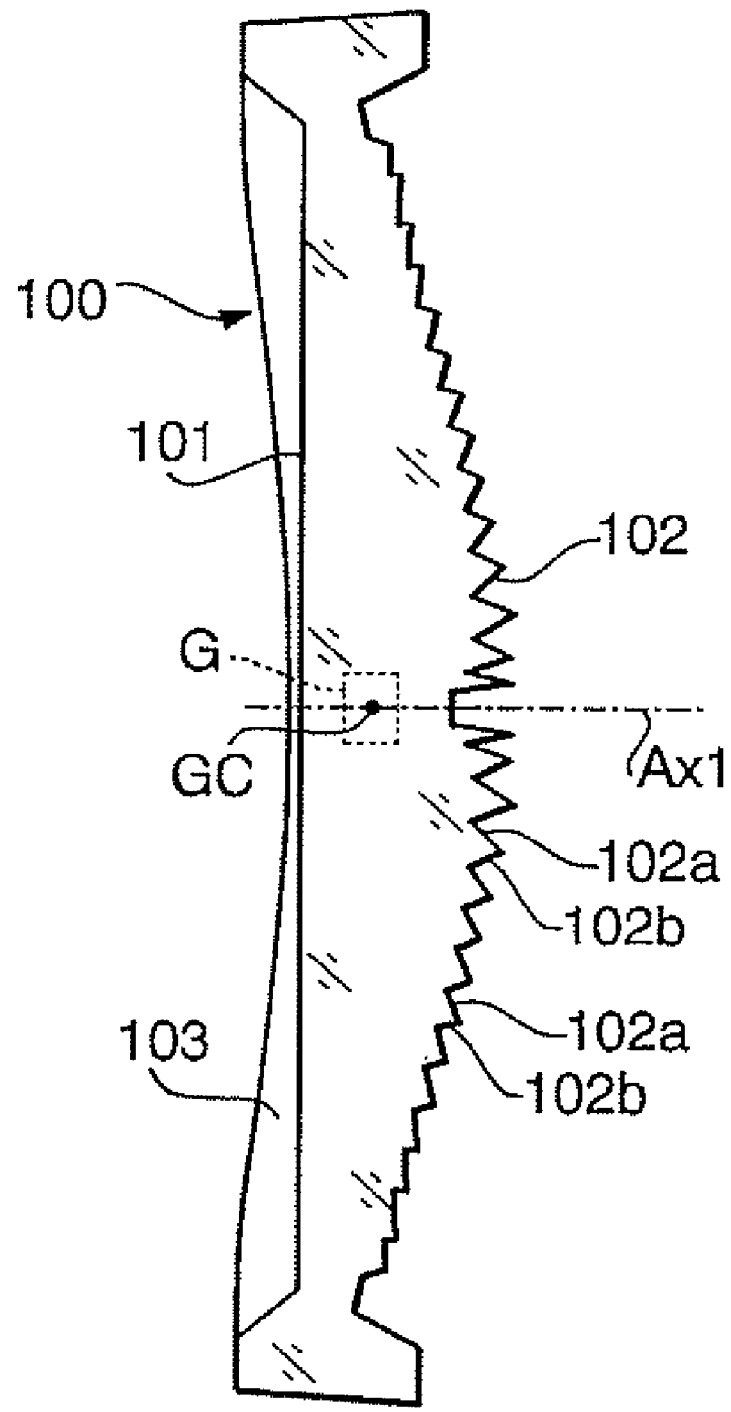
FIG. 9 shows a cross sectional side view of a scanning lens according to a second embodiment.

FIG. 9 shows a cross-sectional side view of a scanning lens 100 according to a second embodiment. The scanning lens 100 is particularly effective when a gate is formed on the rib 13 at a position on the optical axis projected on a plane parallel with the main scanning plane.

The scanning lens 100 is configured such that the first surface 101 is a concave surface, a macroscopic shape of the second surface 102 is a convex surface (i.e., the scanning lens 100 is a positive meniscus lens macroscopically), and a diffractive lens structure is formed on the second surface 102. The diffractive lens structure includes a plurality of rotationally symmetrical annular zones which are concentric about the optical axis Ax1 of the scanning lens 100. The diffractive lens structure includes diffraction operating surfaces 102b that diffract light passing therethrough and stepped surfaces 102a connecting the adjoining diffraction operating surfaces 102b. Around the lens surface through which the light passes, a rib (frame) 103 which is used to secure the lens on a device is formed. In FIG. 9, G denotes the gate for injection molding, and GC denotes the center of the gate.

FIGS. 10A-10C show process of designing the scanning lens 100 shown in FIG. 9. FIG. 10A shows a design example when the deformation in demolding is not taken into account. FIG. 10B shows a design example in which reference lines (broken lines) are added so that the scanning lens 100 is designed based on the design shown in FIG. 10A. FIG. 10C is a partially enlarged view of FIG. 10B.

If the design shown in FIG. 10A is employed, due to the stress working between the scanning lens 100 and the metallic mold, the shape of the diffractive lens structure may be deteriorated, and thus, the diffraction efficiency may be lowered. Therefore, according to the second embodiment, as shown in FIGS. 10B and 10C, the stepped surfaces 102a are designed such that the cross sections thereof on the main scanning plane are substantially parallel with reference lines L1, L2, L3, ..., respectively. Each of the reference lines L1, L2, L3 ... is a line connecting a boundary of each stepped surface 102a and a connected diffraction operating surface 102b on the main scanning plane and a point that is a projection of the center GC of the gate G on the main scanning plane. In generally, the lens formed by the injection molding process tends to contract toward the gate. Therefore, with the above configuration (i.e., by making the inclination of each stepped surface be substantially parallel with corresponding reference line), the stress F1, which is the force to urge the stepped surface of the lens to toward the metallic mold, can be reduced. It should be noted that the stepped surfaces are exaggerated in FIGS. 9 and 10. In the above-described illustrative embodiment, the gate is formed on the optical axis of the scanning lens. It should be noted that the invention need not be limited to such a configuration, and is applicable to a scanning lens in which the gate is shifted from the optical axis of the scanning lens. That is, the invention is applicable to a lens in which the inclinations of the stepped surfaces each connecting the adjoining diffraction surfaces are not rotationally symmetrical with respect to the optical axis.

Next, an scanning optical system employing the scanning lens 10 according to the first embodiment will be described. FIG. 11 schematically shows a perspective view of such a multi-beam scanning optical system. The multi-beam scanning optical system has a light source unit 20 which emits two laser beams. The laser beams are incident on a polygonal mirror 30 and deflected thereby. The deflected laser beams are converged by an imaging optical system L on a photoconductive drum 40. Thus, two beam spots scanning in the main scanning direction (which is a direction of the rotational axis of the photoconductive drum) are formed on the photoconductive drum 40.

The light source 20 includes a first laser diode 21 and a second laser diode 22 each emits a diverging laser beam, and a first collimating lens 23 and a second collimating lens 24 that collimate the two diverging beams, respectively. The light source 20 further includes an anamorphic optical element (e.g., a cylindrical lens) 25 that converges the laser beams in the auxiliary scanning direction. Further, the imaging optical system L includes a scanning lens 10 (e.g., the first lens) according to the first embodiment shown in FIGS. 1A and 1B, and a second lens 50 arranged between the first lens 10 and the photoconductive drum 40.

In the multibeam scanning optical system shown in FIG. 11, the diffractive lens structure formed on the second surface of the first lens 10 is configured to have a function of compensating for lateral chromatic aberration so that, even if the wavelengths of the laser beams emitted by the first and second laser diodes 21 and 22 are different from each other, an error in the width of the scanning width is corrected. It should be noted that the first lens 10 according to the first embodiment can be replaced with the second lens 100 according to the second embodiment.

Next, a concrete design example of the scanning lens 10 according to the first embodiment will be described. The first surface 11 of the scanning lens 10 is a rotationally symmetrical concave aspherical surface. The second surface 12 is configured such that a diffractive lens structure having a function of compensating for lateral chromatic aberration is formed on the base curve, which is the convex rotationally symmetrical aspherical surface.

Generally, the rotationally symmetric aspherical surface can be expressed by a sag amount representing distance of a point on the aspherical surface from a tangential plane contacting the surface at the optical axis Ax1 thereof. Specifically, the convex rotationally asymmetrical aspherical surface is represented by the sag amount X(h), where h represents a distance of a point on the aspherical surface from the optical axis Ax1, and the sag amount X(h) represents the distance of the point on the aspherical surface from the tangential plane. The sag amount X(h) is expressed by equation (1) below.

$$X(h) = \frac{h^2}{r\left(1 + \sqrt{1 - \frac{(\kappa+1)h^2}{r^2}}\right)} + A_4 h^4 + A_6 h^6 + A_8 h^8 + A_{10} h^{10} \quad (1)$$

where, r represents a radius of curvature on the optical axis, $\kappa$ represents a conical coefficient, and $A_4, A_6, A_8, A_{10}$ represent 4th, 6th, 8th and 10th aspherical coefficients, respectively.

Further, the shape of the diffraction lens structure can be represented by another sag amount SAG(h) which also represents a distance of a point on the diffractive lens structure from the tangential plane which is tangent to the scanning lens and contacts thereto on the optical axis Ax1 of the scanning lens. The sag amount SAG(h) of the diffractive lens surface is expressed by equation (2) below.

$$SAG(h) = X(h) + S(h) \quad (2)$$

where, X(h) in equation (2) represents the base curve (i.e., a macroscopic shape of the diffraction lens structure). When the base curve is a rotationally symmetrical surface, the sag amount X(h) of the base curve is expressed by equation (3).

$$X(h) = \frac{h^2}{r\left(1 + \sqrt{1 - \frac{h^2}{r^2}}\right)} \quad (3)$$

where, r represents a radius of curvature of the base curve.

In addition, the diffraction lens structure is defined by an additional optical path length $\Delta\Phi(h)$ is obtained from equation (4) below.

$$\Delta\phi(h) = P_2 h^2 + P_4 h^4 + P_6 h^6 + P_8 h^8 + P_{10} h^{10} \quad (4)$$

where, h is the height from the optical axis Ax1, and Pn is an optical path length difference function coefficient of n-th power (n being an even number).

It should be noted that S(h) in equation (2) is obtained by equation (5), which refers to the additional optical path length $\Delta\phi(h)$ therein. The term S(h) in equation (2) represents a stepwise sag amount which varies in the main scanning direction.

$$S(h) = \frac{[|MOD(\Delta\phi(h) + C - 1)| - C]\lambda}{n - 1 + Dh^2} \quad (5)$$

where, MOD(X,Y) is a modulo function which gives remainder when X is divided by Y, C is a constant which sets a phase of positions of the boundaries of the annular zones ranging from zero to one. Further, D represents a constant for compensating for changes of the additional amount of the phase which is caused as the light beam is incident on the diffractive lens structure as inclined.

Each annular zones is represented by number N which is defined by equation (6).

$$N = INT(|\Delta\phi(h) + C|) \quad (6)$$

where, INT(X) is a function which gives an integer part of the value X.

TABLE 1 shows a numerical configuration of a fundamental shape of a scanning lens according to a first embodiment. In Table 1, r represents a radius (unit: mm) of curvature of each lens on the optical axis. Other parameters are as described above.

TABLE 1

| Lens thickness (on the optical axis) material: PMMA | | |
|---|---|---|
| | FIRST SURFACE | SECOND SURFACE |
| R | −45.000 | −27.000 |
| K | 0.000 | 0.000 |
| $A_4$ | $6.875 \times 10^{-06}$ | $9.472 \times 10^{-06}$ |
| $A_6$ | 0.000 | $6.020 \times 10^{-09}$ |
| $A_8$ | 0.000 | $2.130 \times 10^{-11}$ |
| $A_{10}$ | 0.000 | $-6.120 \times 10^{-14}$ |
| $A_{12}$ | 0.000 | $6.960 \times 10^{-17}$ |
| $P_2$ | — | $-1.430 \times 10^{-01}$ |
| $P_4$ | — | $-2.880 \times 10^{-04}$ |
| $P_6$ | — | 0.000 |
| $P_8$ | — | 0.000 |
| $P_{10}$ | — | 0.000 |

With the above configuration, the shapes of the first surface 11, the base curve of the second surface 12 and each annular zone of the diffractive lens structure formed on the second surface 12 of the scanning lens 10 are defined. By determining the angle of the stepped surfaces between the adjoining annular zones as one of the above-described examples, the concrete shape of the scanning lens 10 is determined. Then, by creating a metallic molding based on the determined shape, and the scanning lens 10 is manufactured by injection molding using the thus created metallic molding.

The present disclosure relates to the subject matter contained in Japanese Patent Application No. 2005-194155, filed on Jul. 1, 2005, which is expressly incorporated herein by reference in its entirety.

What is claimed is:

1. A scanning lens for an imaging optical system that converges a beam emitted by a light source and deflected by a deflector on a target surface to form a beam spot scanning in a main scanning direction thereon, the scanning lens including a plastic lens formed by injection molding, the plastic lens having a diffractive lens structure formed by the injection molding on at least one surface thereof, the diffractive lens structure having a plurality of concentric annular zones which are arranged concentrically about a rotational axis, each of the plurality of annular zones having a diffracting surface that diffracts the light beam passing therethrough, the diffractive lens structure having stepped surfaces connecting each adjoining diffracting surfaces, the stepped surfaces being designed such that, in a plane including the rotational axis and parallel with the main scanning direction, the stepped surfaces are inclined with respect to the rotational axis so that stress working between a metallic molding for the plastic lens and each of the stepped surfaces in demolding is reduced.

2. The scanning lens according to claim 1, wherein design inclination of the stepped surface is substantially similar to a direction in which the lens deforms due to contraction of plastic when the plastic lens is demolded from the metallic molding.

3. The scanning lens according to claim 1,
   wherein the plastic lens is formed such that plastic is injected through a gate which is arranged on the plane substantially parallel with the plane including the rotational axis and parallel with the main scanning direction, and wherein each of the stepped surfaces is designed to be substantially parallel, in the plane substantially parallel with the plane including the rotational axis and parallel with the main scanning direction, with a line connecting a point where the stepped surface is connected with the diffracting surface and a point that is a projection of a substantially central point of the gate on the plane including the rotational axis and parallel with the main scanning direction.

4. A diffractive lens made of plastic formed by injection molding, the diffractive lens having a diffractive lens structure formed by the injection molding on at least one surface thereof, the diffractive lens structure having a plurality of concentric annular zones which are arranged concentrically about a rotational axis, each of the plurality of annular zones having a diffracting surface that diffracts the light beam pass therethrough, the diffractive lens structure having stepped surfaces connecting each adjoining diffracting surfaces, the stepped surfaces being designed such that, in a plane including the rotational axis, the stepped surfaces are inclined with respect to the rotational axis so that stress working between a metallic molding for the plastic lens and each of the stepped surfaces in demolding is reduced.

5. The diffractive lens according to claim 4, wherein design inclination of the stepped surface of the diffractive lens is substantially similar to a direction in which the lens deforms due to contraction of plastic when the diffractive lens is demolded from the metallic molding.

6. The diffractive lens according to claim 4, wherein the diffractive lens is included in an imaging optical system that converges a beam emitted by a light source and deflected by a deflector on a target surface to form a beam spot scanning in a main scanning direction thereon, and wherein the plane including the rotational axis is parallel with the main scanning direction.

7. The diffractive lens according to claim 4, wherein the diffractive lens is formed such that plastic is injected through a gate which is arranged on the plane substantially parallel with the plane including the rotational axis, and wherein each of the stepped surfaces is designed to be substantially parallel, in the plane substantially parallel with the plane including the rotational axis, with a line connecting a point where the stepped surface is connected with the diffracting surface and a point that is a projection of the gate on the plane including the rotational axis.

* * * * *